United States Patent [19]

Jacobs

[11] 4,397,420
[45] Aug. 9, 1983

[54] SPRAYING OF PLANTS, AND APPARATUS THEREFOR

[75] Inventor: Jacobus P. Jacobs, Transvaal Province, South Africa

[73] Assignee: Caraid Patents, N.V., Curacao, Netherlands

[21] Appl. No.: 410,514

[22] Filed: Aug. 23, 1982

Related U.S. Application Data

[63] Continuation of Ser. No. 33,381, Apr. 26, 1979, abandoned.

[30] Foreign Application Priority Data

May 1, 1978 [ZA] South Africa ........................ 78/2472

[51] Int. Cl.³ .............................................. B05B 9/08
[52] U.S. Cl. .................................................. 239/154
[58] Field of Search ............... 239/154, 152, 151, 373; 222/633; 417/437, 472, 903

[56] References Cited

U.S. PATENT DOCUMENTS

| 632,418 | 9/1899 | Landis | 239/154 |
| 2,012,521 | 8/1935 | Rognerud | 239/154 |
| 3,409,184 | 11/1968 | Stengle | 417/472 |

FOREIGN PATENT DOCUMENTS

| 152543 | 7/1913 | Canada | 239/154 |
| 46969 | 2/1933 | Denmark | 239/154 |
| 57710 | 7/1940 | Denmark | 239/154 |
| 2453959 | 5/1976 | Fed. Rep. of Germany | 239/154 |
| 421471 | 9/1946 | Italy | 239/154 |
| 928537 | 6/1963 | United Kingdom | 239/154 |

Primary Examiner—John J. Love
Assistant Examiner—Gene A. Church
Attorney, Agent, or Firm—Kemon & Estabrook

[57] ABSTRACT

The liquid reservoir tank of plant spraying equipment of the haversack type is pressurized by a pair of foot pumps worn by the operator under his shoes. Each pump comprises a resiliently compressible hollow cushion which is compressed by the operator's weight as he places the relevant foot on the ground and which expands when he lifts that foot from the ground, air being drawn into the cushion as it expands and being displaced from it into the tank as the cushion is compressed.

9 Claims, 7 Drawing Figures

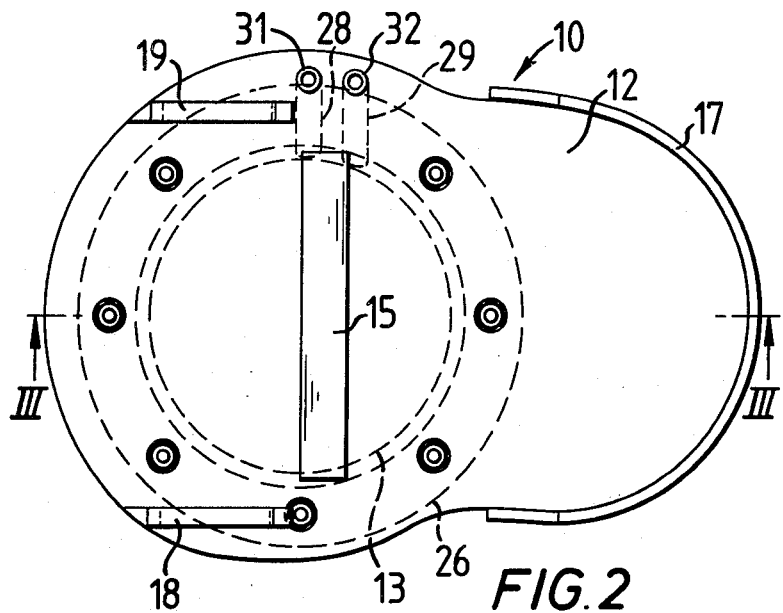
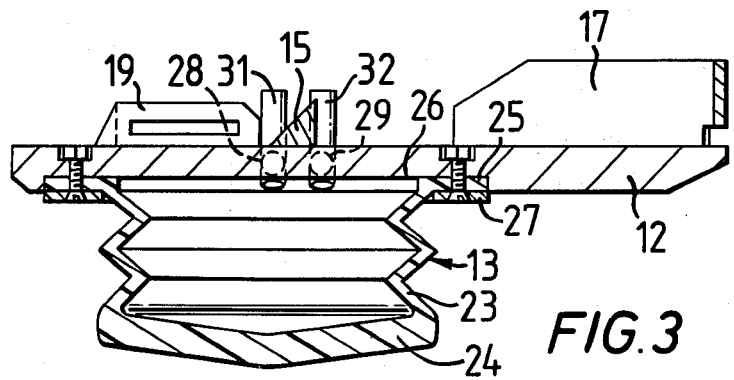

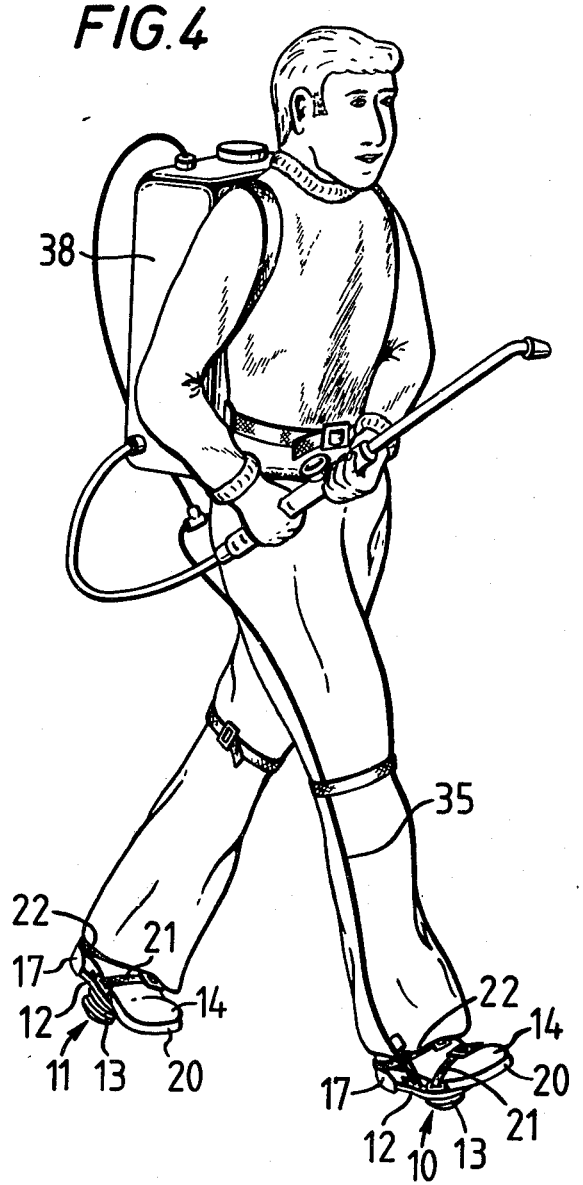

SPRAYING OF PLANTS, AND APPARATUS THEREFOR

This is a continuation, of application Ser. No. 33,381 filed Apr. 26, 1979, now abandoned.

DESCRIPTION

This invention relates to the spraying of plants and to apparatus therefor. In particular it relates to portable spray apparatus.

According to one aspect of this invention, there is provided a method of applying pressure to liquid stored in a portable tank which is being carried by an operator, the pressure being applied so that the liquid can be discharged from the tank under the control of the operator to form a spray for spraying plants, wherein the operator wears an air pump under one of his feet so that it is operated by the application of his mass to it, such as will occur while he is walking, the air pump being connected to the tank so that air that is displaced by operation of the pump is pumped into the tank to generate the pressure that is applied to the liquid.

The operator may wear another air pump under his other foot so that it also is operated by the application of his mass to it, the other air pump being connected to the tank as well so that air that is displaced by its operation is also pumped into the tank.

Preferably the operator wears the pump, or each pump, so that its axis that traverses the sole of his foot passes between the ball and the base of the heel of the respective foot under which it is worn. This enables air pressure to be generated by the pump for a longer time interval and also enables higher pressure to be generated as the wearer walks than would be so if the pump was worn at an end of the foot.

According to another aspect of this invention there is provided an air pump comprising means defining at least one resiliently compressible chamber having an air inlet opening and an air outlet opening, and securing means for securing the chamber under a foot of a wearer in such a way that the wearer can cause successive compression and expansion of the internal volume of the chamber by successively loading the chamber by applying his mass to it and unloading the chamber such as will occur when he walks.

Preferably spray apparatus comprising a portable tank for containing liquid to be sprayed and adapted to be carried by an operator includes at least one such air pump which has its inlet opening connected with ambient atmosphere and its outlet opening connected to the tank.

One form of liquid spray apparatus in which this invention is embodied, and the method by which it is operated will be described now by way of example with reference to the accompanying drawings, of which:

FIG. 2 is a plan view of one of the foot pumps of the apparatus shown in FIG. 1 and is drawn to a larger scale than FIG. 1;

FIG. 3 is a section on the line III—III in FIG. 2;

FIG. 4 is an illustration in perspective of an operator who is wearing the apparatus shown in FIGS. 1, 2 and 3 and who is operating the foot pumps to pressurize the liquid reservoir tank, by walking.

Figure 1:
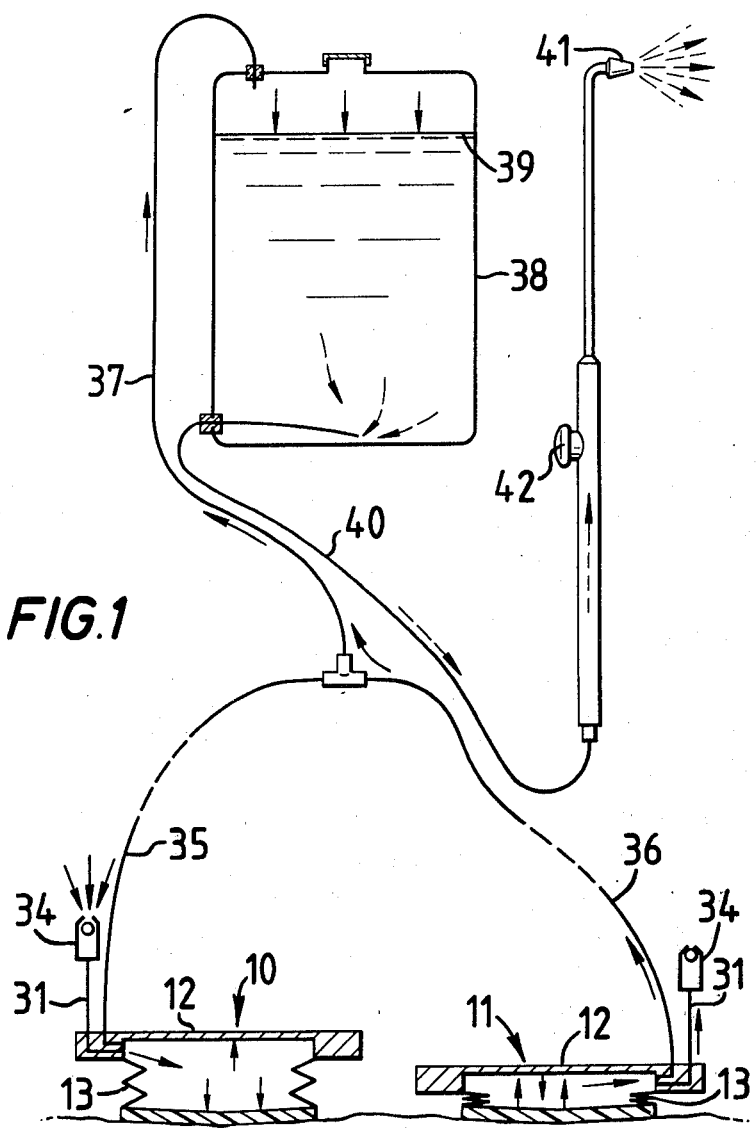
FIG. 1 is a diagrammatic illustration of the apparatus.

FIGS. 1 and 4 show that the apparatus includes two foot pumps which are indicated generally at 10 and 11. The two pumps 10 and 11 are substantially similar, although they are of opposite hands. The pump 10 is now described in detail and corresponding parts of the foot pump 11 are identified in the following description and in the drawings by the same reference characters.

The foot pump 10 comprises a base plate 12 and a hollow cushion 13. The baseplate 12 is adapted to be fitted under a shoe 14 worn by the operator so that the cushion 13 depends from it. FIGS. 2 and 3 show that the upper surface of the baseplate 12 has locating formations formed on it, one 15, being a cross bar which is adapted to be abutted by the front edge of the heel 16 of the shoe 14, another 17 being an arcuate rim which receives the sides and rear of the heel 16, and the others 18 and 19 being side stops which are adapted to engage opposite sides of the sole 20 of the shoe 14 in the region of the instep. The length of the base plate 12 is such that, when worn, it spans the instep portion of the shoe 14 and abuts the sole 20 just behind the ball of the foot on which the shoe 14 is worn. Straps 21 and 22 are provided for securing the foot pump 10 to the shoe 14 with the baseplate 12 located relative to the heel 16 and sole 20 by engagement of the formations 15, 17, 18 and 19 around the heel 16 and the sole 20.

The hollow cushion 13 is a one-piece moulding of polyurethane. FIG. 3 shows that it comprises a circular side wall 23 which has its lower end closed by downwardly tapered base 24 and which has a radially outwardly directed peripheral flange 25 formed at its upper end. The flange 25 is received snugly in a circular recess 26, which is formed in the underside of the baseplate 12, and is clamped in position in an air-tight manner by a clamp ring 27 which is screwed to the baseplate 12. The side wall 23 is convoluted so that the configuration of the cushion 13 is that of a bellows. Drillings 28 and 29 formed in the base plate 12 place the interior of the cushion 13 in communication with the bores of a pair of tubes 31 and 32 which are spigotted into respective holes formed in the upper surface of the baseplate 12. Each of the tubes 31 and 32 has a non-return valve (not shown) force fitted into its upper end. The valve fitted to the tube 32 permits displacement of air from the interior of the cushion 13 through the drilling 29 and the respective tube 32 but prevents backflow from the tube 32 to the interior of the cushion 13. The valve fitted to the tube 31, which is represented diagrammatically at 34 in FIG. 1 allows induction of air into the interior of the hollow cushion 13 via a path formed by the tube 31 and drilling 28 and prevents exhaust in the opposite direction along that path.

The recess 26 is located such that the central axis of the hollow cushion 13 extends between the ball of the foot on which the shoe 14 is worn and the base of the heel of that foot. Hence the cushion 13 is substantially in line with the lower leg portion by which the operator's weight is transmitted to his foot when that foot is grounded.

The polyurethane material selected for moulding to form the cushion 13 is a wear resistant resilient material which has good shape memory characteristics as well as being impermeable to air. Hence, due to the inherent resilience of the polyurethane material, the cushion reassumes its preloaded form or shape after release of an applied load that deformed it from that preloaded form or shape.

Figure 5A:
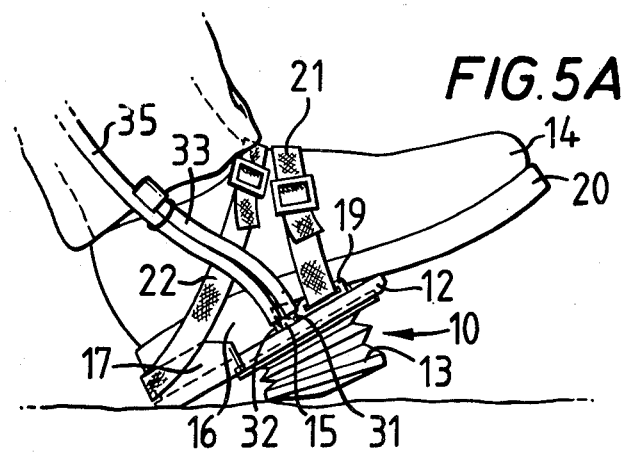
FIGS. 5A, 5B and 5C illustrate the manner in which each foot pump is actuated by the foot of the operator on which it is worn as the operator walks.
Figure 5B:
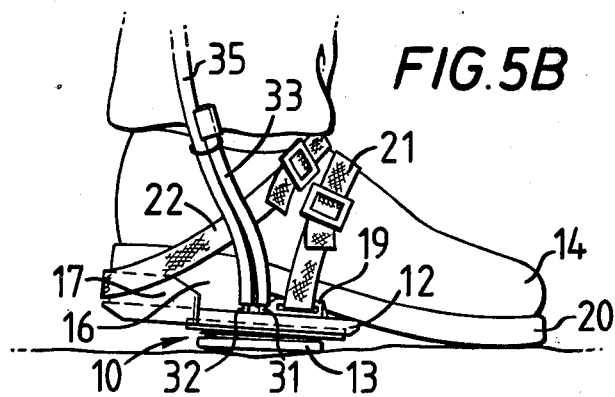
Figure 5C:
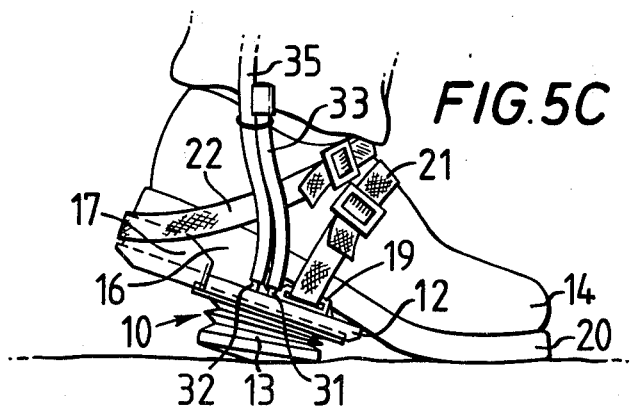

FIGS. 5A, 5B and 5C show that the tube 31 is spigotted into a short flexible pipe 33 which extends to just above the shoe 14. An air filter 30 is fitted to the upper end of the pipe 33.

The other tubes 32 of the two pumps 10 and 11 are connected via flexible pipes 35 and 36 to a common conduit 37 which feeds via a non-return valve (not shown) into a spray liquid reservoir tank 38 of the haversack type which contains spray liquid to the level 39. The reservoir tank 38 has a delivery conduit 40 leading to a spray head 41 via a control valve 42. The tank 38 is provided with a suitable vent valve.

In use of the apparatus to spray plants, an operator carries the haversack type tank 38 on his back and wears the pumps 10 and 11 strapped under his left and right shoes 14 respectively.

The pumps 10 and 11 are operated alternately as the operator walks, the hollow cushion 13 of the pump 10,11 under the shoe 14 that is grounded being compressed by the mass of the operator whilst the cushion 13 of the other pump 10,11 is in its expanded state until the respective foot is next placed on the ground. Successive compression and expansion of each pump 10,11 during the heel to toe movement of the respective foot that is grounded during walking is illustrated in FIGS. 1, 5A, 5B and 5C. Initial contact of the shoe 14 with the ground is made by the lower rear edge of the heel 16, as shown in FIG. 5A, and that is preceded by contact of the base of the respective cushion 13 so that compression of that cushion 13 began just before the initial contact of the heel 16 with the ground. The shoe 14 is then pivoted about the heel 16 to bring the sole 20 of the shoe 14 to the ground when, as shown in FIG. 5B, compression of the cushion 13 is complete. The heel 16 is then lifted so that expansion of the cushion 13 begins as shown in FIG. 5C and that expansion continues until first the sole 20, and then the cushion 13 itself has been lifted from the ground. FIG. 1 shows that air within the cushion 13 is displaced from the cushion 13 to the pipe 35 as the cushion 13 is compressed, whilst ambient air is drawn into the interior of that cushion 13, via the pipe 33 as the cushion 13 expands. Alternate compression and expansion of the two hollow cushions 13 causes air to be pumped into the space above the liquid level 39. The pressure in this space will increase and will place the spray liquid under pressure in the reservoir tank 38. Operation of the valve 42 will result in liquid being sprayed from the spray head 41 under the pressure inside the reservoir tank 38.

Thus, as can be seen from FIG. 1, the spray liquid issues in a spray from the spray head 41 and is directed under pressure onto the leaves of a plant.

The non-return valves fitted into the tubes 31 and 32 and the hollow cushion 13 are replaceable.

I claim:

1. Liquid spray apparatus comprising a portable tank for containing liquid to be sprayed and adapted to be carried by an operator, and at least one air pump comprising means defining at least one resiliently compressible chamber having an air inlet opening which is in communication with ambient atmosphere, and an air outlet opening which is connected to the interior of the tank so that air displaced from the chamber is fed to the tank to pressurize liquid in the tank, and securing means for securing the chamber under a foot of a wearer in such a way that, by the heel to toe engagement of the respective foot with the ground as he walks, the wearer causes successive compression and expansion of the internal volumn of the chamber by successively loading the chamber by applying his mass to it and unloading the chamber, the chamber being formed by a footplate which is adapted to be fitted under an article of footwear, which is worn by the wearer, and to be secured in position by said securing means, and a hollow cushion which is formed of an impermeable material which has an aperture formed in it and which has the perimeter of the aperture fitted in a fluid tight manner to the underside of the footplate wherein the improvements comprises the footplate carrying locating means which are adapted to locate it relative to the article of footwear to which it is secured when the pump is worn, and the cushion is fitted to the footplate so that its central axis that traverses the footplate passes between the ball and the base of the heel of the respective foot whereby, when the pump is worn, said hollow cushion is substantially in line with the lower leg portion by which the wearer's weight is transmitted to his foot when that foot is grounded and pressure is generated by compression of the cushion substantially continuously throughout movement of the respective foot from heel to toe until the cushion is fully compressed by direct application of the wearer's body weight to it which occurs as the sole is brought to the ground.

2. Liquid spray apparatus comprising a portable tank for containing liquid to be sprayed and adapted to be carried by an operator, and at least one air pump comprising means defining at least one resiliently compressible chamber having an air inlet opening which is in communication with ambient atmosphere, and an air outlet opening which is connected to the interior of the tank so that air displaced from the chamber is fed to the tank to pressurize liquid in the tank, and securing means for securing the chamber under a foot of a wearer in such a way that, by the heel to toe engagement of the respective foot with the ground as he walks, the wearer causes successive compression and expansion of the internal volume of the chamber by successively loading the chamber by applying his mass to it and unloading the chamber, the chamber being formed by a foot plate which is adapted to be fitted under an article of footwear, which is worn by the wearer, and to be secured in position by said securing means, and a hollow cushion which is formed of an impermeable material which has an aperture formed in it and which has the perimeter of the aperture fitted in a fluid tight manner to the underside of the footplate wherein the footplate carries locating means which are adapted to locate it relative to the article of footwear to which it is secured when the pump is worn, and the cushion is fitted to the footplate so that its central axis that traverses the footplate passes between the ball and the base of the heel of the respective foot.

3. Liquid spray apparatus according to claim 2, wherein the cushion has a base and a side wall which is formed in the manner of a bellows, the undersurface of the base being tapered downwardly from the fore and aft edges to a central apex.

4. Liquid spray apparatus according to claim 2 or claim 3, wherein the resilience of the resiliently compressible chamber is derived solely from the inherent resilience of the material from which the hollow cushion is formed and the tendency for compressed air therewithin to expand.

5. Liquid spray apparatus according to claim 4, wherein the material from which the hollow cushion is formed is a polyurethane material.

6. Liquid spray apparatus comprising a portable tank for containing liquid to be sprayed and adapted to be carried by an operator, and at least one air pump comprising means defining at least one resiliently compressible chamber having an air inlet opening which is in communication with ambient atmosphere, and an air outlet opening which is connected to the interior of the tank so that air displaced from the chamber is fed to the tank to pressurize liquid in the tank, and securing means for securing the chamber under a foot of a wearer in such a way that, by the heel to toe engagement of the respective foot with the ground as he walks, the wearer causes successive compression and expansion of the internal volume of the chamber by successively loading the chamber by applying his mass to it and unloading the chamber, the chamber being formed by a footplate which is adapted to be fitted under an article of footwear, which is worn by the wearer, and to be secured in position by said securing means, and a hollow cushion which is formed by an impermeable material which has an aperture formed in it and which has the perimeter of the aperture fitted in a fluid tight manner to the underside of the footplate, wherein the resilience of the resiliently compressible chamber is derived solely from the inherent resilience of the material from which the hollow cushion is formed and the tendency for compressed air therewithin to expand.

7. Liquid spray apparatus comprising a portable tank for containing liquid to be sprayed and adapted to be carried by an operator, and at least one air pump comprising means defining at least one resiliently compressible chamber having an air inlet opening which is in communication with ambient atmosphere, and an air outlet opening which is connected to the interior of the tank so that air displaced from the chamber is fed to the tank to pressurize liquid in the tank, and securing means for securing the chamber under a foot of a wearer in such a way that, by the heel to toe engagement of the respective foot with the ground as he walks, the wearer causes successive compression and expansion of the internal volume of the chamber by successively loading the chamber by applying his mass to it and unloading the chamber, the chamber being formed by a foot plate which is adapted to be fitted under an article of footwear, which is worn by the wearer, and to be secured in position by said securing means, and a hollow cushion which is formed of an impermeable material which has an aperture formed in it and which has the perimeter of the aperture fitted in a fluid tight manner to the underside of the foot plate wherein the improvement comprises a foot plate carrying locating means which are adapted to locate it relative to the article of footwear to which it is secured when the pump is worn whereby it spans an instep portion of that footwear article between a heel and a part of the sole at the ball of the respective foot, said locating means including a crossbar which is located on the upper surface of the foot plate and which has a heel abutment surface which is positioned to be abutted by a front edge of the heel, said locating means also including a rear rim which receives the rear of the heel, and the cushion being fitted to the underside of the foot plate with its center location being a portion of the foot plate which is forwards of said heel abutment surface and behind that part of the foot plate which abuts said sole part so that its central axis that traverses the foot plate passes between the ball and the base of the heel of the respective foot whereby, when the pump is worn, said hollow cushion is substantially in line with the lower leg portion by which the wearer's weight is transmitted to his foot and when that foot is grounded and pressure is generated by compression of the cushion substantially continuously throughout movement of the respective foot from heel to toe until the cushion is fully compressed by direct application of the wearer's body weight to it which occurs as the sole is brought to the ground.

8. Liquid spray apparatus according to claim 7, wherein the front edge of the foot plate is said part which abuts said sole part.

9. Liquid spray apparatus comprising a portable tank carried by an operator and containing a liquid to be sprayed, at least one air pump comprising a resilient compressible chamber having an air inlet communicating with ambient atmosphere and an air outlet connected to said tank for delivering air thereto for pressurizing the liquid to said tank, a base plate adapted to be fitted under the footwear of said operator with said base plate extending from the heel to the ball of the foot of the operator, said base plate having a transverse cross bar which constitutes an abutment for the forward edge of the heel of the operator's footwear, an arcuate shaped vertically extending rim member secured to an end of the said base plate for receiving and holding the heel portion of the operator's footwear, said base plate having vertically extending side elements positioned forwardly of said crossbar for engaging the sides of the operator's footwear, securing means engaging said side elements for attaching said base plate to the operator's footwear, said chamber connected to said base plate beneath said cross bar in a fluid tight manner such that, by the heel to toe engagement of the respective foot with the ground as he walks, the operator by applying his mass through his lower leg portion and arch portion of his foot, causes successive compression and expansion of the internal volume of the chamber by successively loading and unloading the chamber.

* * * * *